United States Patent [19]

Poslek et al.

[11] 3,961,615

[45] June 8, 1976

[54] DETOXICATION DEVICE FOR EXHAUST GASES OF INTERNAL-COMBUSTION ENGINES

[76] Inventors: Stjepan Poslek; Vladimir Pericki, both of Vinagorska 19, Zagreb, Yugoslavia

[22] Filed: Feb. 14, 1974

[21] Appl. No.: 442,344

[30] Foreign Application Priority Data
Feb. 20, 1973 Yugoslavia............................ 425/73
Aug. 17, 1973 Yugoslavia.......................... 2240/73

[52] U.S. Cl..................... 123/119 DB; 123/124 R; 123/141
[51] Int. Cl.² ......................................... F02M 23/02
[58] Field of Search ..... 123/119 D, 119 DB, 124 R, 123/141; 261/141, 78 R, 76, DIG. 19, 65; 48/180 R

[56] References Cited
UNITED STATES PATENTS

| | | |
|---|---|---|
| 1,184,611 | 5/1916 | Boucher.......................... 123/119 D |
| 1,453,296 | 5/1923 | Wagner......................... 123/119 DB |
| 1,471,983 | 10/1923 | Stockman..................... 123/119 DB |
| 1,761,692 | 6/1930 | Stepp.......................... 123/119 DB X |
| 1,942,187 | 1/1934 | Ruffino........................... 123/119 D |
| 2,100,466 | 11/1937 | Bashford et al. ............. 123/119 DB |
| 2,342,046 | 2/1944 | Greene......................... 123/119 DB |
| 3,190,275 | 6/1965 | Serrup.......................... 123/119 DB |
| 3,568,437 | 3/1971 | Briggs....................... 123/119 DB X |
| 3,768,789 | 10/1973 | August......................... 123/119 D X |

*Primary Examiner*—Charles J. Myhre
*Assistant Examiner*—Ira S. Lazarus
*Attorney, Agent, or Firm*—Karl F. Ross; Herbert Dubno

[57] ABSTRACT

A device disposed between a carburetor and the intake manifold of an internal combustion engine has a passage aligned with the carburetor and intake manifold opening into which secondary-air is admitted radially from a valve system connected to the accelerator pedals of the vehicle.

1 Claim, 6 Drawing Figures

DETOXICATION DEVICE FOR EXHAUST GASES OF INTERNAL-COMBUSTION ENGINES

The subject of the present invention is a detoxification device for the exhaust gases of internal-combustion engines equipped with a carburetor, said detoxication being performed homogenization of the mixture of air and liquid fuel before it enters the engine cylinders. A homogenization device for the mixture of air and liquid fuel of internal-combustion engines equipped with a carburetor is known according to the Swiss Pat. No. 479,805, which attains a better combustion of the fuel mixture in the engine and reduces th toxicity of exhaust gases. The known device as mentioned consists of an internally cone-shaped homogenization chamber in which a cone-shaped diaphragm with a perforated mantle is received. Additional air is fed into this homogenization chamber through corresponding channels equipped with control organs for the additional air which is supplied either automatically in dependence upon the difference between atmospheric pressure and pressure in the homogenization chamber or in dependence upon the position of the butterfly valve of the carburetor, in which case the control element for additional air in the homogenization device is connected by a mechanical transmission to the shaft of the butterfly valve of the carburetor.

The known homogenisation device, moreover, has a control element for the flow of liquid fuel into the idling nozzle for a predetermined number of the revolutions per minute of the engine, in which said nozzle is opened when the speed of the engine falls below this predetermined value. The control element is closed when the speed increases over a determined number of revolutions per minute.

The disadvantages of this and other known devices are mainly that the air-and-fuel mixture has a turbulent flow into the suction side of the engine, and that the devices are relatively complicated in design and in assembly so that their application in some existing types of engines requires the preparation of special connecting elements whereby the installation in existing engines is made appreciably more costly.

It is the object of the invention to provide a detoxification device for internal-combustion engines in which the disadvantages of known devices as mentioned will be suppressed, i.e. which will provide a laminar flow of the air-and-fuel mixture into the suction side of the engine, will ensure a uniform composition of the mixture at various engine speeds, will increase the intake velocity of the mixture, thereby assuring the evaporation of condensed fuel droplets in the intake channels of the suction side of the engine, will be simple and relatively universal for mounting in any type of vehicle and will attain a noticeable reduction of carbon monoxide (CO) and of unburned hydrocarbons (CH) in the exhaust and which will not significantly influence the nitrogen oxides ($NO_x$) content. Further it is an object of this invention to provide a device which will be inexpensive to produce and simple to install and adjust.

These objects are realized by a detoxification device for exhaust gases of internal combustion engines according to the present invention which comprises an assembly for mixing secondary air with the air-and-fuel mixture supplied from the carburetor, and an assembly for volume control of secondary air in dependence upon the position of the gas pedal. This device is mounted between the carburetor and the suction (intake) side of the engine.

CVS-tests of exhaust gases of engines eqipped with a detoxication device according to the present invention show a content of 0.2 volume percent of carbon monoxide with a heated-up engine without load, while under the same conditions with an engine without said device the content of carbon monoxide reached about 5 volume percent by the same test. Because of the uniform air-and-fuel mixture at various rotational speeds of the engine, the fuel consumption is reduced by approximately 10 percent by the application of this invention.

A detailed description of the detoxication device for exhaust gases will be given for two embodiments of the invention with reference to accompanying drawing in which.

Figure 1:
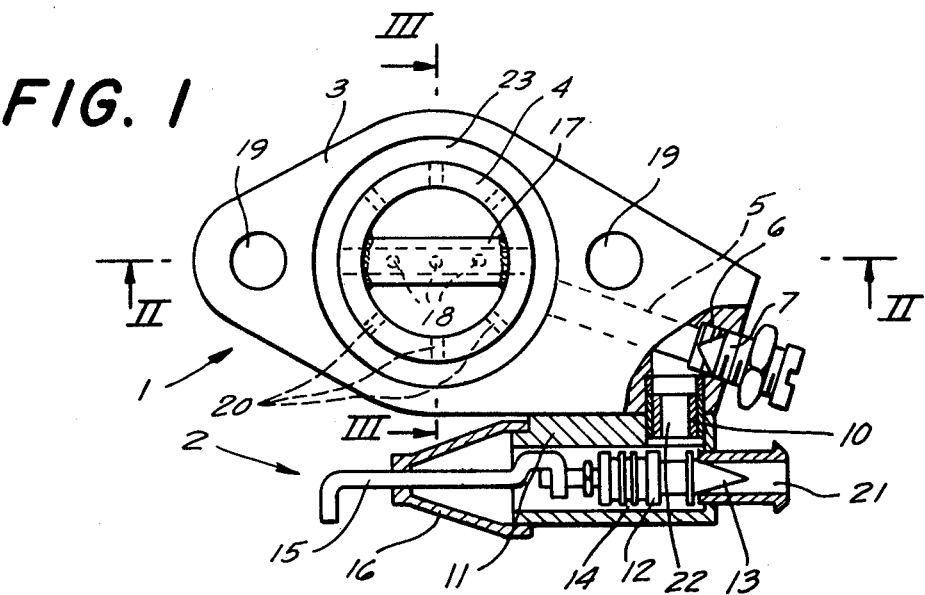
FIG. 1 is a plan view of a detoxification device for an internal-combustion engines, partially in cross-section.
Figure 2:
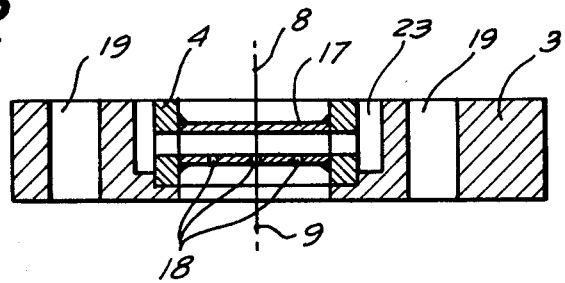
FIG. 2 is a cross-section of the device along line II—II of FIG. 1.
Figure 3:
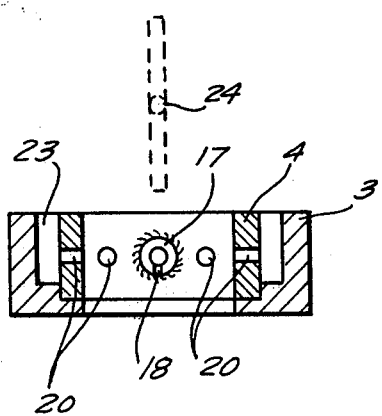
FIG. 3 is a cross-section of the device along line III—III of FIG. 1.

FIG. 1, 2 and 3 show the first embodiment of the detoxification device for which consists of an assembly 1 for mixing secondary air with the air-and-fuel mixture, and of an assembly 2 for volume control of secondary air depending upon the position of the gas pedal. The casing 3 of the assembly 1 contains a ring 4 across which a tube 17 is placed diametrically. Where the tube 17 is fixed to the ring, the latter contains openings having a diameter equal to the internal diameter of tube 17 (FIG. 2). Thereby a diametral passage is provided between the two opposite sides of the ring (annular) channel 23 formed between the ring 4 and the casing 3. To the mentioned channel 23, a channel 5 for secondary air is connected laterally. The channel 5 at its end has a screw 7 for the volume control of secondary air at engine idling; the cone-shaped end of the screw 7 protrudes into the orifice 22 in which is received a threaded sleeve 10 for the connection of the supply of secondary air from the assembly 2 to the assembly 1 for mixing secondary air with the air-and-fuel mixture. The secondary air, which is delivered from the assembly 2 through the orifice 22 and the channel 5 into the ring channel 23, flows through apertures 20, worked radially in the circumference of ring 4 and also into the tube 17 wherefrom it proceeds through apertures 18 which are arranged laterally on the tube 17 lying in the direction of the flow of the mixture of air and liquid fuel and are directed in the direction of the flow as mentioned, into the flow of the air-and-fuel mixture. The number and arrangement of the apertures 18 on the tube 17 and of apertures 20 on the ring 4 are arbitrary. The assembly 2, which is connected to the assembly 1 by the threaded sleeve 10, consists of a cylinder 11 which on its one end is fitted with an intake fitting 21 into which the cone-shaped head 13 of the piston 12 protrudes; the piston 12 is slidingly movable in the cylinder 11. On the end opposite to the intake socket 21, the mentioned cylinder 11 is equipped with a protective sleeve 16 through which a lever 15 passes. The lever 15 can be connected with the gas pedal. For better sealing, the piston 12 is equipped with several consecutive annular channels 14. The magnitude of throttling the secondary air at the initial position of piston 12 is adjusted by an adjusting screw screwed into the lever 15, to set the cone-shaped head 13 so that it protrudes to a greater or smaller extent into the opening of the intake socket 21. As has already been mentioned in the introduction, the detoxification device for exhaust gases is mounted between the output side 8 of the carburetor and the intake side 9 of the suction side in the position shown in FIG. 2, i.e. that the apertures 18 in the tube 17 are directed in the direction of the flow of the air-and-fuel mixture. For the connection with the corresponding flange of the output side of the carburetor and with the corresponding flange of the suction side, the casing 3 has apertures 19 by which the device is fastened by screws. When the device is mounted it must be ensured that the axis of the shaft 24 of the throttle valve of the carburetor coincides with the axis of the tube 17 (cf. FIG. 3) in order to obtain a better laminar flow.

The first embodiment of the detoxication device for exhaust gases of an engine according to FIGS. 1 to 3 operates as follows:

Secondary air which is added to the mixture of air and liquid fuel enters into the intake fitting 21 which is usually connected to the air filter by a rubber hose (not shown in the drawing). From the intake socket 21, secondary air flows through the ring opening between the cone-shaped head 13 and the opening of the intake socket 21, the cross-section cf which ring opening being the greater the less the cone-shaped head 13 protrudes into the opening of the intake socket 21. As already mentioned, the movement of the cone-shaped head 13 or the piston 12, respectively, depends upon the position of the gas pedal which is, by known mechanism, linked to lever 15. The secondary air then enters in a part of cylinder 11, further through the orifice 22 of the threaded sleeve 10 into the channel 5, which leads the secondary air into the ring channel 23 (FIGS. 1 and 2). Therefrom a portion of the secondary air passes through radial apertures 20 of the ring 4 and flows horizontally towards the center approximately perpendicularly into the flow of the air-and-fuel mixture which in the zone of ring 4 passes in the direction from the carburetor side 8 towards the suction side 9, while another portion of secondary air enters the pipe 17 and flows out of it through apertures 18 in the direction of the flow of the mixture. Thus a better mixing of fuel and air and a laminar and accelerated flow are obtained, thereby effecting a better homogenization of the mixture which is supplied to engine cylinders.

Figure 4:
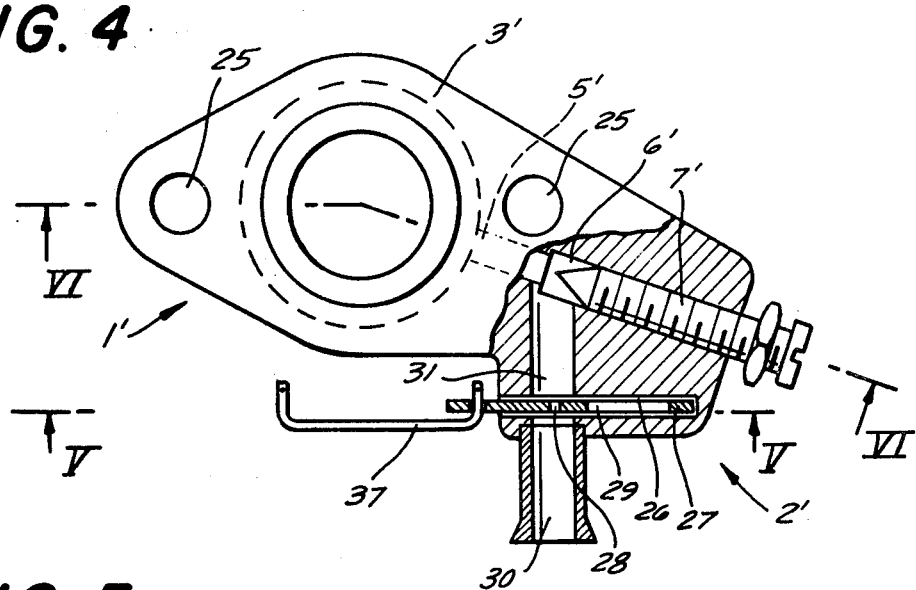
FIG. 4 is a plan view of another embodiment of a detoxification device for of internal-combustion engines, partially in cross-section.
Figure 5:
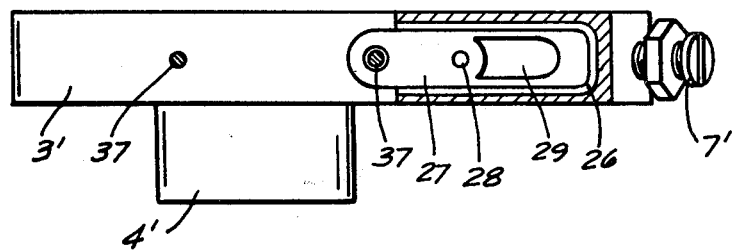
FIG. 5 is a cross-section of the device along line V—V of FIG. 4.
Figure 6:
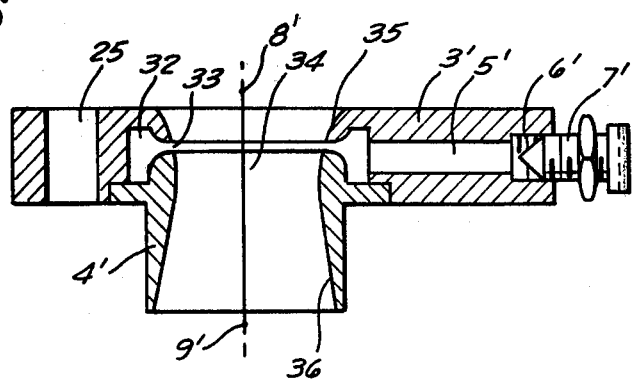
FIG. 6 is a cross-section of the device along line VI—VI of FIG. 4.

FIGS. 4, 5 and 6 illustrate another embodiment of the detoxication device for exhaust gases which consists of an assembly 1' for mixing secondary air to the mixture and of an assembly 2' for volume control of secondary air, depending upon the gas pedal. The casing 3' of the assembly 1', the opening of which is made as intake orifice 35 contains a ring 4' which together with the casing provides a ring channel 32 and at the end of the intake orifice 35 a slot 33 wich extends over the circumference of the orifice 34 shaped by component elements of the casing 3' and the ring 4', which at its end opposite to the slot 33 is formed as outlet orifice 36. Laterally from the ring channel 32, the casing 3' contains a channel 5' beginning in the ring channel 32 and extending to the edge of casing 3' where it is closed by a control screw 7' which protrudes into the channel 31 for connection of the intake fitting 30 to the said channel 5'.

Next to the intake fitting 30, the casing body contains a rectangular channel 26, in which a sliding shield 27 is placed, having a greater opening 29 and a smaller aperture 28 for engine idling. To the end of the shield 27 which protrudes from the rectangular channel 26, a lever 37 is connected which is intended for indirect linking to the gas pedal.

The casing 3' has bores 25 through which screws are inserted for fixing the device by connecting the corresponding flanges of the carburetor output and of the suction side.

This second embodiment of the detoxication device for exhaust gases of internal combustion engines according to FIGS. 4 to 6 operates as follows:

The secondary air supplied into the mixture of air and liquid fuel enters into the intake fitting 30 (which is by a rubber hose connected to the air filter) wherefrom at engine idling with closed shield 27 it passes through the aperture 28. At normal loading of the engine, the shield 27 which is by the lever 37 linked to the gas pedal is shifted outwards so that the secondary air passes through the opening 29 and the channel 31, the orifice of which can be additionally adjusted for the idling engine by the screw 7' into the channel 5' and therefrom into the ring channel 32. The secondary air from this ring channel enters through the slot 33 between the casing 3' and the ring 4' perpendicularly to the direction of the flow of the mixture into the orifice 34 which at this place is narrowed and forms with the intake orifice 35 and the outlet orifice 36 a channel shaped as a Venturi tube. Due to the narrowing on the point of entrance of the secondary air into the flow of the mixture, the flow velocity increases and the pressure is reduced, whereby a better evaporation of fuel droplets in the mixture and in the intake channels of the suction side of the engine is attained. By mixing in the Venturi tube, a laminar flow and a uniform air-and-fuel mixture are obtained at various rotational speeds of the engine.

What we claim is:

1. The combination with an internal-combustion engine having a carburetor provided with a butterfly valve controlled by an accelerator pedal and feeding fuel-air mixture to an intake manifold of the engine, of a detoxification device interposed between said carburetor and said intake manifold, said detoxification device comprising:

a generally flat casing formed with a passage communicating between said carburetor and said intake manifold and formed on one side with an intake orifice;

a ring received in said casing on the opposite side of said passage and defining therein a ring-shaped diffusor channel outwardly of said orifice and an annular slot extending around the circumference of said orifice, and opening from said channel inwardly at the end of said orifice, said ring being formed with an outlet orifice widening away from said slot, said casing being formed with a bore communicating with said channel at one end of the bore, another passage extending angularly from said bore and communicating therewith, a fitting mounted on said casing for supplying secondary air thereto, and a rectangular channel extending perpendicular to said fitting and said further passage;

a slidable shield received in said rectangular channel and formed with a small cross section opening and a large cross section opening respectively alignable with said further passage; and operating means connected with said shield for selectively positioning said openings in communication between said fitting and said further passage in response to displacement of said accelerator.

\* \* \* \* \*